(12) United States Patent
Corte, Jr. et al.

(10) Patent No.: US 10,060,538 B2
(45) Date of Patent: Aug. 28, 2018

(54) DOUBLE PIECE RETAINER FOR COMPACT VALUE

(71) Applicant: Cortec, L.L.C., Houma, LA (US)

(72) Inventors: Bobby Corte, Jr., Houma, LA (US); Troy Callahan, Houma, LA (US)

(73) Assignee: Cortec, L.L.C., Houma, LA (US)

( * ) Notice: Subject to any disclaimer, the term of this patent is extended or adjusted under 35 U.S.C. 154(b) by 186 days.

(21) Appl. No.: 14/631,970

(22) Filed: Feb. 26, 2015

(65) Prior Publication Data

US 2015/0247579 A1 Sep. 3, 2015

Related U.S. Application Data

(60) Provisional application No. 61/946,252, filed on Feb. 28, 2014.

(51) Int. Cl.
*F16K 5/20* (2006.01)
*F16K 5/06* (2006.01)

(52) U.S. Cl.
CPC .......... *F16K 5/0642* (2013.01); *F16K 5/0689* (2013.01); *F16K 5/201* (2013.01); *F16K 5/06* (2013.01); *Y10T 137/0508* (2015.04); *Y10T 137/6035* (2015.04); *Y10T 137/6041* (2015.04)

(58) Field of Classification Search
CPC ...... F16K 27/067; F16K 39/045; F16K 39/06; F16K 5/06; F16K 5/0626; F16K 5/0642; F16K 5/0689; F16K 5/0678; F16K 5/0673; Y10T 137/0491; Y10T 137/0508; Y10T 137/0519; Y10T 137/0525; Y10T 137/6031; Y10T 137/6035; Y10T 137/6038; Y10T 137/6041

USPC ......... 251/315.01, 315.07, 315.14, 360–363, 251/367, 315.08, 315.09, 315.1, 315.11, 251/314, 316, 359

See application file for complete search history.

(56) References Cited

U.S. PATENT DOCUMENTS

| | | | |
|---|---|---|---|
| 3,033,227 A * | 5/1962 | Goldman | F16K 5/0642 137/328 |
| 3,038,489 A | 6/1962 | Allen | |
| 3,154,094 A | 10/1964 | Bredtschneider et al. | |
| 3,269,692 A | 8/1966 | Shafer | |

(Continued)

OTHER PUBLICATIONS

FMC Fluid Control Systems Ball Valves Brochure, "World Proven Valves for High Pressure Shutoff and Manifold Applications," Brochure BV-1/95. FMC Corporation. KF Series NB/NC Manifold Component System Brochure, 1994. KF Industries, Inc.

*Primary Examiner* — Reinaldo Sanchez-Medina
*Assistant Examiner* — Hailey K Do
(74) *Attorney, Agent, or Firm* — Brett A. North

(57) ABSTRACT

A compact manifold ball valve having a valve body, valve ball, valve stem and two piece retainer system; the valve body including a valve chamber having first and second ends, and a first flow passage intersecting the valve chamber and valve ball. The valve ball can be trunnion supported and include pair of movable seat assemblies that can be used to seal the valve ball to the valve body. A two piece retainer can be used to hold in place the valve components, the two piece retainer including a first section which moves only linearly along with a second retainer piece that is a threaded ring that rotationally locks in place the first section of the two piece retainer. The two pieces of the retainer can be symmetrically located about the centerline of the flow passage of the valve body.

23 Claims, 16 Drawing Sheets

(56) References Cited

U.S. PATENT DOCUMENTS

| | | | |
|---|---|---|---|
| 3,288,430 A | 11/1966 | Priese | |
| 3,462,120 A | 8/1969 | Priese | |
| 3,463,449 A | 8/1969 | Nelson et al. | |
| 3,480,253 A | 11/1969 | Priese et al. | |
| 3,576,309 A | 4/1971 | Zawacki et al. | |
| 3,599,933 A * | 8/1971 | Piccardo | F16K 5/0626 251/174 |
| 3,624,804 A * | 11/1971 | Piccardo | F16K 5/0626 251/367 |
| 3,697,043 A | 10/1972 | Baker | |
| 3,705,707 A | 12/1972 | Scaramucci | |
| 3,771,545 A | 11/1973 | Allen | |
| 3,778,029 A | 12/1973 | Baker | |
| 3,893,469 A | 7/1975 | Baker | |
| 3,895,776 A | 7/1975 | Laurens | |
| 4,044,994 A | 8/1977 | Priese | |
| 4,111,393 A | 9/1978 | McClurg et al. | |
| 4,134,595 A | 1/1979 | Melville | |
| 4,135,545 A | 1/1979 | Fowler et al. | |
| 4,137,936 A | 2/1979 | Sekimoto et al. | |
| 4,254,793 A | 3/1981 | Scaramucci | |
| 4,262,688 A | 4/1981 | Bialkowski | |
| 4,262,691 A | 4/1981 | Kacal | |
| 4,280,522 A | 7/1981 | Pechnyo et al. | |
| 4,286,614 A | 9/1981 | Kacal et al. | |
| 4,332,370 A | 6/1982 | Williams | |
| 4,342,444 A | 8/1982 | Sonderman | |
| 4,345,738 A | 8/1982 | Ripert | |
| 4,428,561 A | 1/1984 | Thompson | |
| 4,458,878 A * | 7/1984 | Tsuno | F16K 5/0626 251/152 |
| 4,477,055 A | 10/1984 | Partridge | |
| 4,523,608 A | 6/1985 | Miller | |
| 4,566,482 A | 1/1986 | Stunkard | |
| 4,637,421 A | 1/1987 | Stunkard | |
| 4,718,444 A | 1/1988 | Boelte | |
| 4,867,414 A | 9/1989 | Hubacek | |
| 4,911,408 A | 3/1990 | Kemp | |
| 5,275,191 A | 1/1994 | Bernard | |
| 5,327,923 A | 7/1994 | Eischen et al. | |
| 5,752,690 A | 5/1998 | Ellett | |
| 5,927,687 A | 7/1999 | Krause | |
| 6,065,736 A | 5/2000 | Hunt | |
| 6,669,171 B1 | 12/2003 | Stunkard | |

* cited by examiner

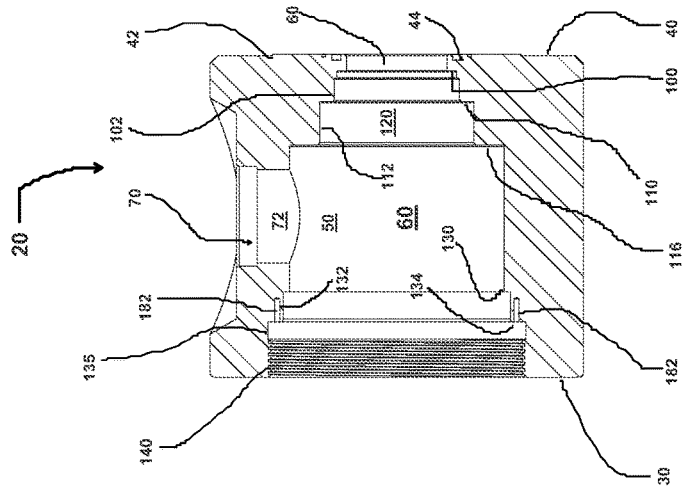
FIG. 19
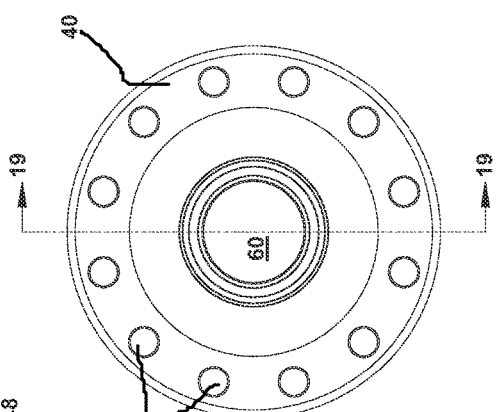
FIG. 18
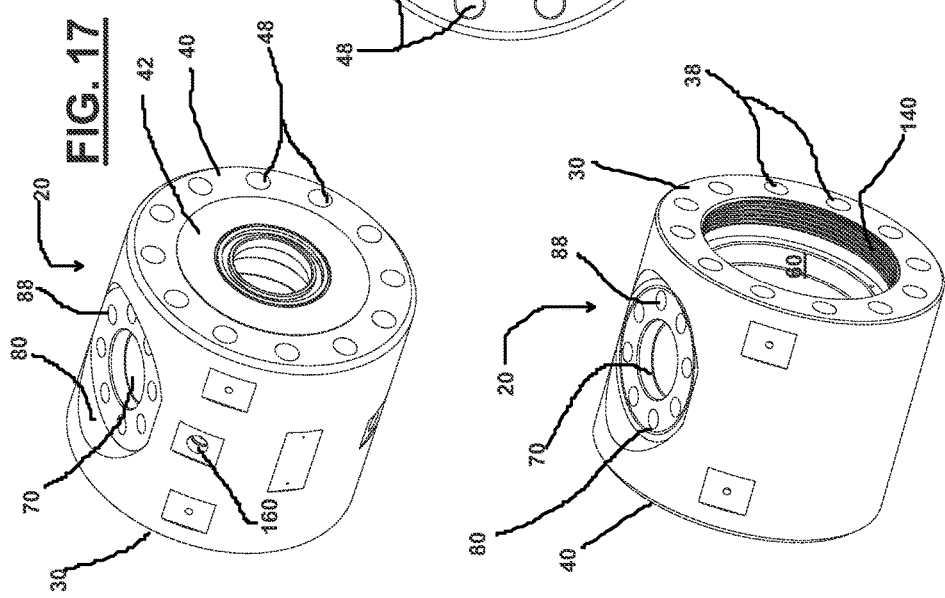
FIG. 17
FIG. 16

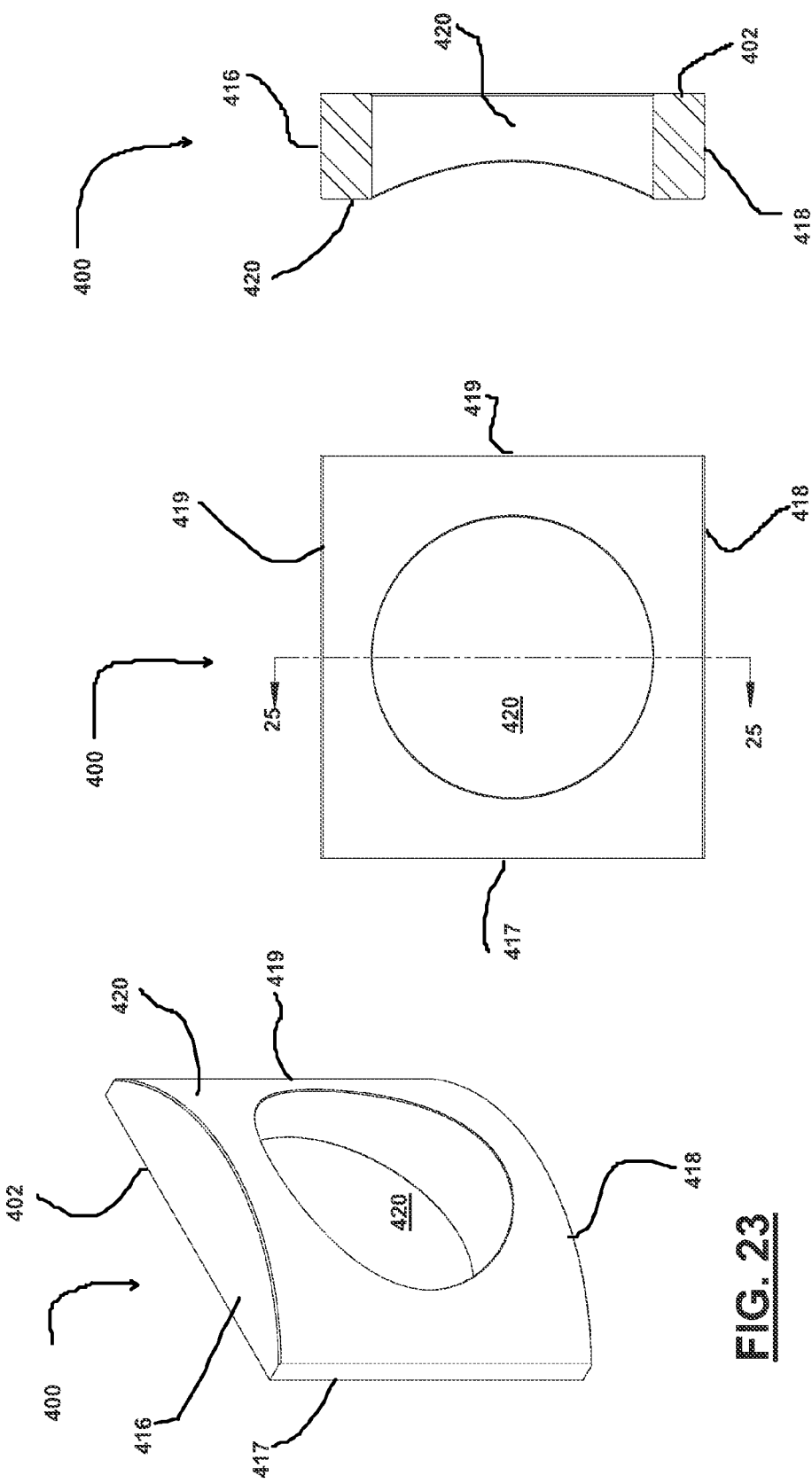

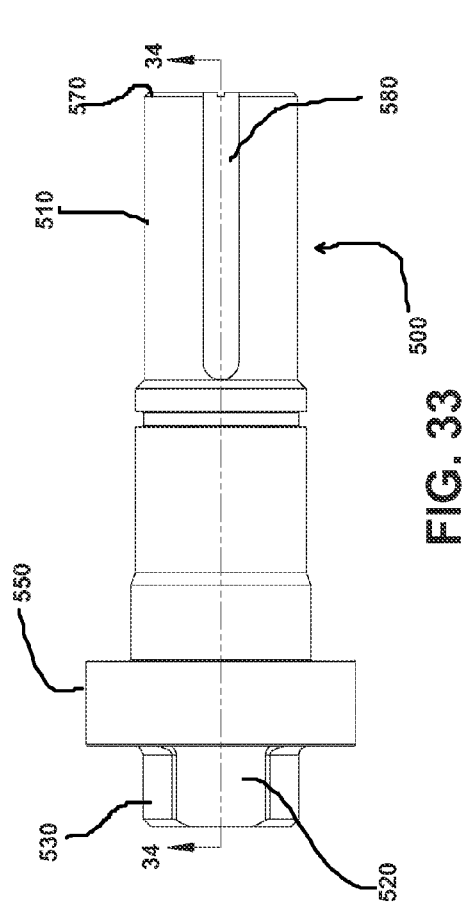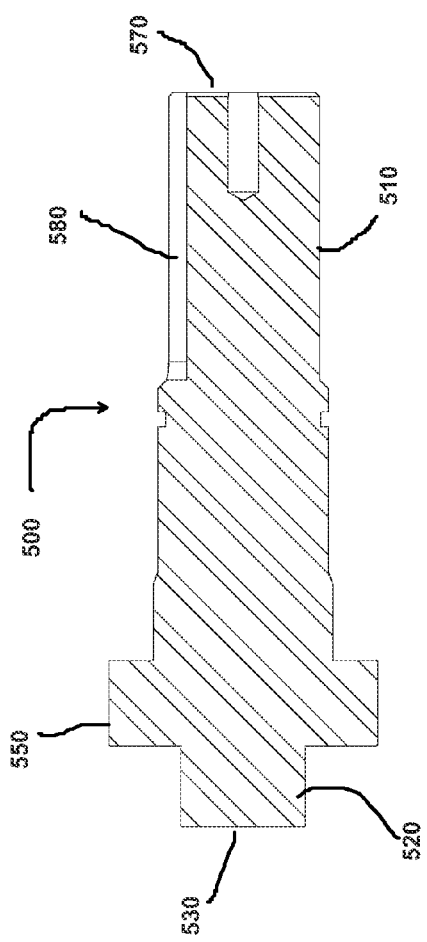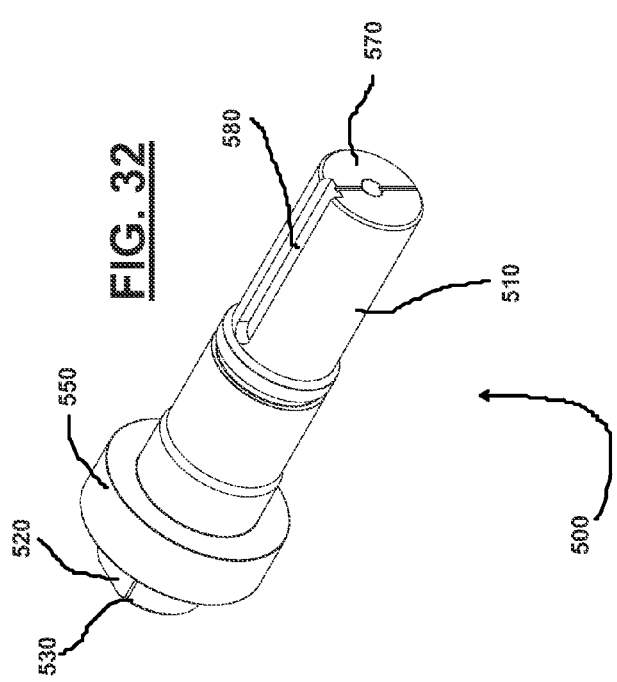

DOUBLE PIECE RETAINER FOR COMPACT VALUE

CROSS-REFERENCE TO RELATED APPLICATIONS

This is a non-provisional of U.S. Provisional Patent Application Ser. No. 61/946,252, filed Feb. 28, 2014, which is incorporated herein by reference.

Priority of U.S. Provisional Patent Application Ser. No. 61/946,252, filed Feb. 28, 2014, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Conventionally available are side entry compact valves including a valve ball having integral opposed trunnions rotating in upper and lower trunnion support plates, which plates are supported by the valve body, with right and left valve seats and seals for sealing, and all of which components are inserted and removed from the valve body via one of the side openings of the valve, and which components are held in place during use with a threaded retainer.

The "compact" nature of compact valves generally results from a short or compact valve body having opposed "open" ends each defining a flange closure seat which is engaged by and establishes sealing with a flange closure which may be defined by a flange of a pipe section of the manifold or other piping assembly. Since no other body closure members are provided, the overall length of the valve body is short and compact as compared with the valve body structures of conventional ball valves. Accordingly, the compact manifold ball valves can be installed in piping systems such as flow control manifolds in offshore production platforms where minimal space is available.

One example of a type of side entry compact valve is disclosed in U.S. Pat. No. 6,669,171 for a "Compact Manifold Trunnion Ball Valve" which is incorporated herein by reference. The upper and lower trunnion support plates prevent the valve ball from transferring downstream loads to the seals and seats reducing frictional forces between the ball and seals.

However, in conventionally available side entry compact valves generally a single piece retainer is threadably connected to the valve body, wherein such single piece retainer must be rotated relative to both the valve body and the adjacent valve seat with such relative rotation causing wear to the seals between the valve seat and retainer along with the seals between the retainer and valve body.

It has been found that sealing elements in compact valves have a significant risk of becoming excessively worn and/or damaged during valve assembly and/or disassembly. It has been found that relative rotational movement between the valve components and the seals increase the risk of substantial wear and/or damage to the seals.

It would be advantageous to have a retainer both threadably connected to the valve body and concentrically positioned in said body, wherein there is little no relative rotational movement between sealing elements for the valve seat and retainer.

It would be advantageous to have a retainer both threadably connected to the valve body and concentrically positioned in said body, wherein there is little no relative rotational movement between sealing elements for the valve body and retainer.

SUMMARY

One embodiment generally relates to compact ball valves for use in conduit manifold systems. More particularly one embodiment includes a compact manifold ball valve having a valve body, valve ball, and valve stem; the valve body including a valve chamber having first and second ends, and a first flow passage intersecting the valve chamber and valve ball. The valve ball can be trunnion supported with at least one trunnion support element. A pair of movable seat assemblies can be used to seal the valve ball to the valve body. In one embodiment the above referenced components can be held in place during use with a threaded two piece retainer.

In one embodiment the two piece retainer longitudinally holds in place at least one trunnion support element restricting the amount of longitudinal movement of said trunnion support element. In one embodiment two trunnion support elements are longitudinally held in place with restricted to no longitudinal movement allowed.

In one embodiment is provided a retainer which is both threadably connected to the valve body and concentrically positioned in said body includes a sealing portion having little to no relative rotational movement between sealing elements for the valve seat and retainer section during valve assembly.

In one embodiment is provided a two piece retainer which is both threadably connected to the valve body and concentrically positioned in said body, wherein the two piece retainer includes first and second sections, wherein the first section having little to no relative rotational movement between sealing elements for the valve seat and retainer section during valve assembly.

In one embodiment is provided a two piece retainer which is both threadably connected to the valve body and concentrically positioned in said body, wherein the two piece retainer includes first and second sections, wherein the second section is threadably connected to the valve body such that rotation of the second section relative to the valve body causes either tightening or loosening of the first section relative to the valve body.

In one embodiment is provided a two piece retainer including first and second sections, wherein the second section is a ring, and rotational movement of the second section causes linear movement of the second section.

In one embodiment rotational movement of the first section relative to the valve body is constrained and/or prevented. In one embodiment at least one locking pin rotationally locks the first section relative to the valve body while allowing linear movement of the first section relative to the valve body.

In one embodiment rotational movement of the first section relative to the valve body is constrained and/or prevented while relative linear movement is allowed. In one embodiment the first section includes a detachable sealing element along with at least one locking pin that rotationally locks the first section relative to the valve body while simultaneously allowing linear movement of both the first section and sealing element relative to the valve body.

In one embodiment the first section includes a first detachable sealing element and the valve seat includes a second detachable sealing element. In this embodiment the first section also includes at least one locking pin that rotationally locks the first section relative to the valve body while simultaneously allowing linear movement of the first section (and the first sealing element when attached to the first section) relative to the valve body, along with relative movement between the valve seat (and second sealing element when attached to the valve seat) with respect to the first section. In one embodiment the first sealing element forms a seal between the first section and valve body, while the second sealing element forms a seal between the first section and valve seat.

In one embodiment the first section includes first and second detachable and spaced apart sealing elements, along with at least one locking pin that rotationally locks the first section relative to the valve body while simultaneously allowing linear movement of the first section (and the first and second sealing elements when attached to the first section) relative to the valve body. In one embodiment the first sealing element forms a seal between the first section and valve body, while the second sealing element forms a seal between the first section and valve seat.

In one embodiment the locking pins are have a relatively small shear force where a rotational force exceeding a predefined force will cause the shear pin(s) to shear and allow rotational movement between the first section and valve body.

In one embodiment two locking pins are used which are symmetrically spaced about the first section of the retainer.

In various embodiments at least 50 percent of the longitudinal length of the first retainer section enters the interior portion of the valve body. In various embodiments at least 55, 60, 65, 70, 75, 80, 85, 90, 95, 96, 97, 98, 99, and 100 percent of the first retainer section enters the interior portion of the valve body during assembly. In various embodiments the amount of longitudinal length of the first retainer section entering the valve body during assembly is between about a range of any two of the above referenced percentages.

In various embodiments at least 50 percent of the longitudinal length of the second retainer section enters the interior portion of the valve body. In various embodiments at least 55, 60, 65, 70, 75, 80, 85, 90, 95, 96, 97, 98, 99, and 100 percent of the second retainer section enters the interior portion of the valve body during assembly. In various embodiments the amount of longitudinal length of the second retainer section entering the valve body during assembly is between about a range of any two of the above referenced percentages.

In one embodiment the retainer pins are less than about 3 mm in diameter. In various embodiments the retainer pins are less than about 3, 2.5, 2.0, 1.9, 1.8, 1.7, 1.6, 1.5, 1.4, 1.3, 1.2, 1.1, 1.0, 0.9, 0.7, 0.6, 0.5, 0.4, 0.3, 0.2, and 0.1 mm. In various embodiments the diameters of the retainer pines are between about any two of the diameters specified in this paragraph.

In various embodiments the first retainer section includes a plurality of openings and the valve body includes a plurality of openings which match the plurality of openings for the first retainer section. In various embodiments a plurality of retainer pins can be placed in the plurality of openings to rotationally lock the first retainer section with respect to the valve body.

In various embodiments the second retainer section locks in place the plurality of retainer pins in their respective plurality of openings.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 12 shows both the first and second retainer sections before placement in the valve body of the compact valve.

FIG. 13 shows the valve of FIG. 12 where the first retainer section has been partially inserted into the valve body, but the second retainer section has not yet been inserted into the valve body.

FIG. 14 shows the valve of FIG. 12 where both the first and second retainer sections have been partially inserted into the valve body.

FIG. 15 shows the valve of FIG. 12 where both the first and second retainer sections have been completely inserted into the valve body.

FIG. 16 is a perspective view of the valve body taken from the first end of the valve body.

FIG. 17 is a perspective view of the valve body taken from the second end of the valve body.

FIG. 18 is a side view of the second end of the valve body.

FIG. 19 is a sectional view of the valve body taken along the lines 19-19.

FIG. 23 is a perspective view of the trunnion support element shown in the valve of FIG. 1;

FIG. 24 is an end view of the trunnion support element shown in FIG. 23.

FIG. 25 is a sectional view of the trunnion support element shown in FIGS. 23 and 24, taken along the lines 25-25.

FIG. 32 is a perspective view of the stem shown in the valve of FIG. 1.

FIG. 33 is a side view of the stem shown in FIG. 32.

FIG. 34 is a sectional view of the stem shown in FIGS. 32 and 33, taken along the lines 34-34.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Overview of Compact Valve with Two Piece Retainer

Figure 1:
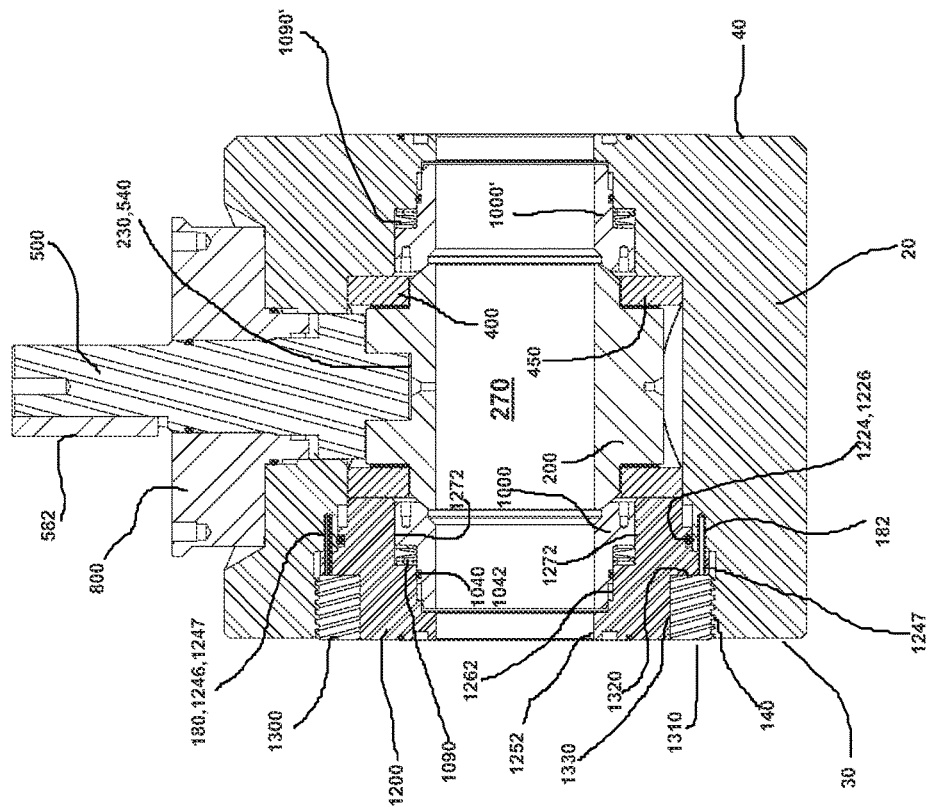
FIG. 1 is a sectional side view of one embodiment the showing a compact valve body with a two piece retainer holding in position the valve ball and trunnion support elements along with the valve ball seats.
Figure 2:
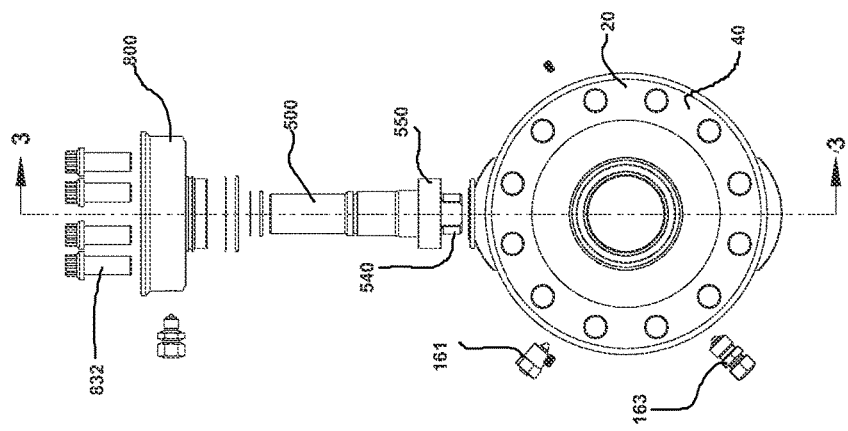
FIG. 2 is an end view of the compact valve shown in FIG. 1, but all valve components shown in an exploded condition from the second end of the body of the compact valve.
Figure 3:
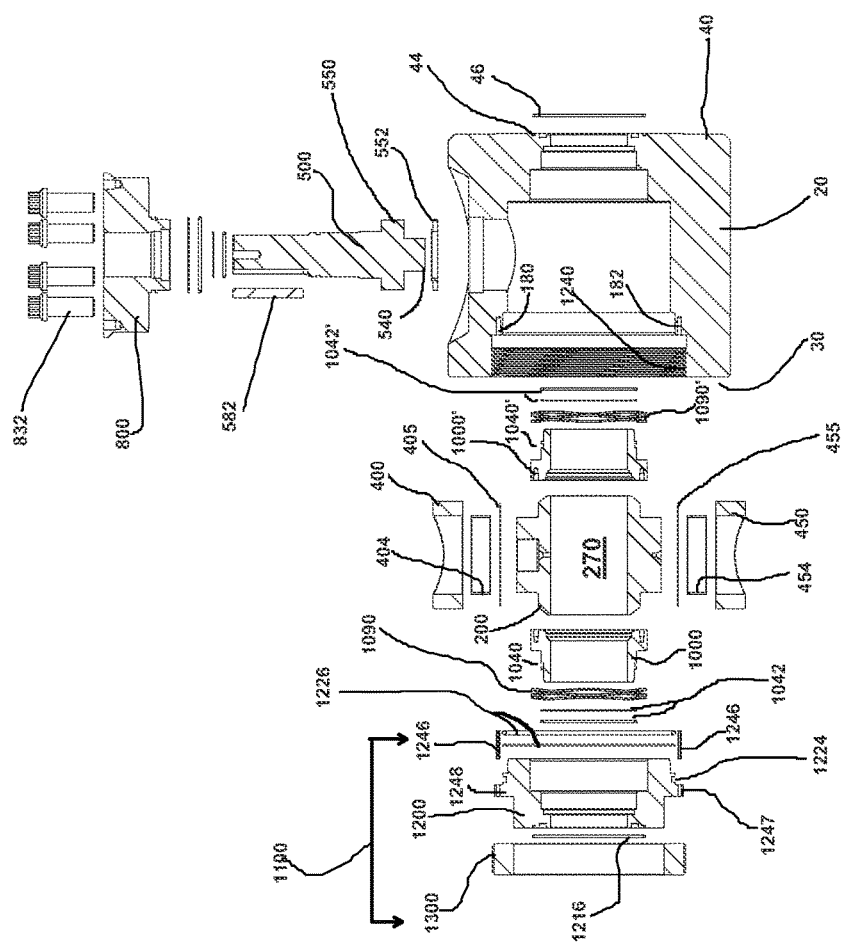
FIG. 3 is a sectional view of the compact valve shown in FIG. 4 taken along the lines 3-3.

FIG. 1 is a sectional side view of one embodiment showing an assembled compact valve body 20 with a two piece retainer 1100 (first 1200 and second 1300 sections) installed in the valve body 20 retaining a valve ball 200 and seats 1000,1000' in the valve body 20. FIG. 2 is an end view of compact valve 10, showing certain valve components in an exploded condition—this end view being taken from the second end 40 of body 20. FIG. 3 is a sectional side view of the compact valve 10 taken along the lines 3-3 generally showing all valve components in an exploded condition.

Figure 10:
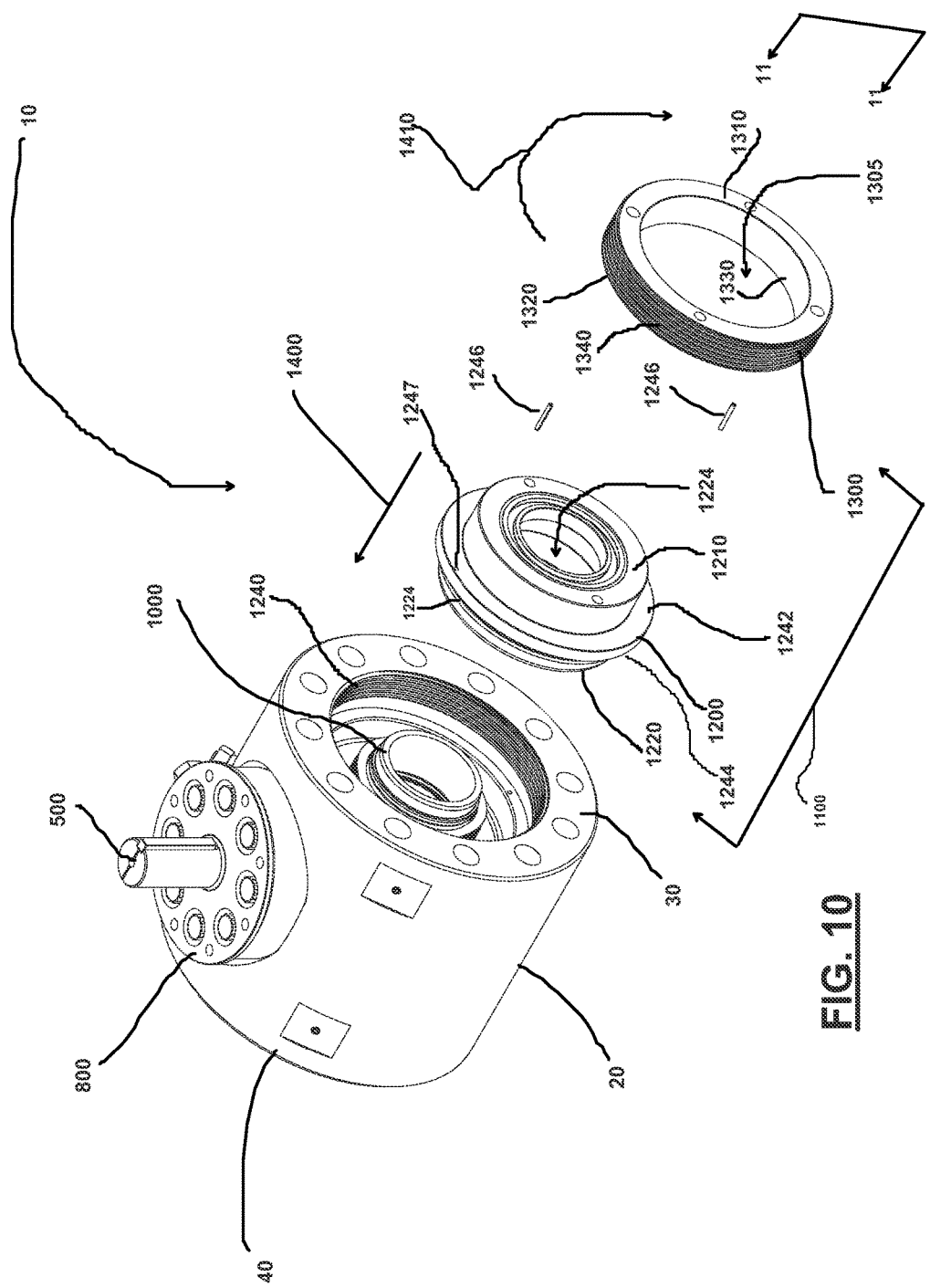
FIG. 10 is a partially exploded perspective view of the valve of FIG. 1 with the two piece retainer of FIGS. 4 through 9 positioned to be installed in the valve body where the valve ball and seats are already installed in the valve body.
Figure 11:
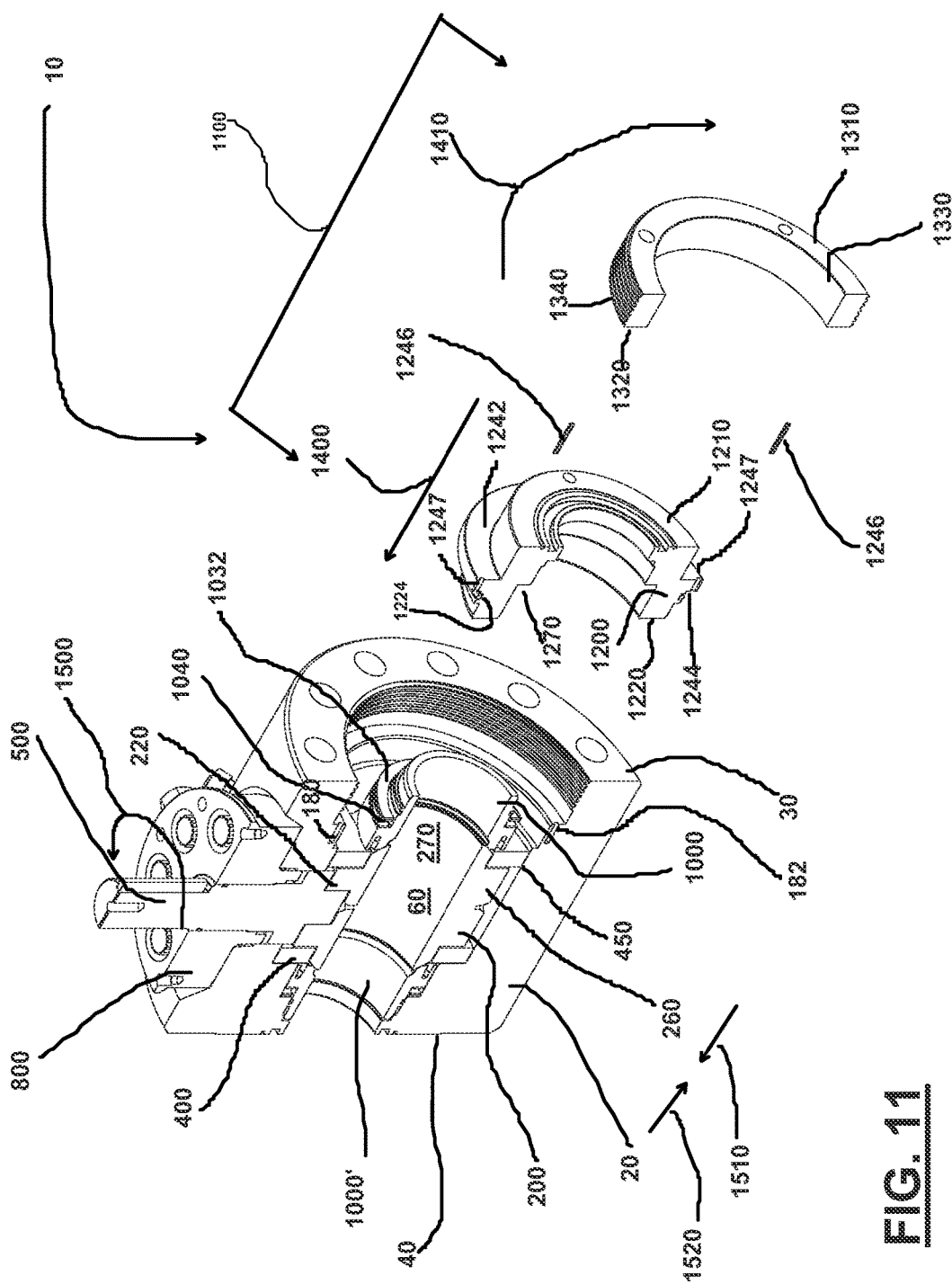
FIG. 11 is a sectional view of the partially exploded view of the embodiment shown in FIG. 10 taken along with lines 11-11.

FIG. 10 is a partially exploded perspective view of compact valve 10 showing valve body 20 with the two piece retainer 1100 (first 1200 and second 1300 sections) positioned to be installed in the valve body 20 where the valve ball 200 and seats 1000,1000' are already installed in the valve body 20. FIG. 11 is a sectional view through the partially exploded view of the compact valve 10 taken along with lines 11-11.

In one embodiment compact valve 10 can comprise body 20, valve ball 200, and two piece retainer 1100. Valve ball 200 can be rotatably and sealably connected to body 20. Valve body 20 can include flow passage 60. Valve ball 200 can include flow passage 270. To allow flow through flow passage 60 of valve body 20, flow passage 270 can be aligned, either partially or wholly, with flow passage 60. To restrict or prevent flow through flow passage 60, flow passage 270 can be non-aligned, either partially or wholly, with flow passage 60. Alignment of flow passage 270 can be made by rotating valve ball 200 relative to valve body 20.

Valve ball 200 can be rotatably supported in body 20 by trunnions 220 and 260. Trunnion 220 can be rotatably connected to trunnion support element 400. Trunnion 260 can be rotatably connected to trunnion support element 450. Valve ball 200 can be operatively connected to stem 500, such as through stem recess 220. Stem recess 230 can have a rectangular cross section, although other types of operably connections can be made such as square, ribbed, or any non-circular shaped recess; or any type of mechanical connection.

In one embodiment rotating stem 500, such as in the direction of arrow 1500, causes similar rotation of valve ball 200. Stem 500 itself can be rotatably connected to body 20. Trunnion support element 400 can be supported in body 20. Accordingly, although valve ball 200 can rotate relative to valve body, longitudinal movement (i.e., arrows 1510,1520) can be restricted and/or prevented depending on the relative amount of longitudinal movement allowable between: valve ball 200 and trunnion support elements 400,450; and trunnion support elements 400,450 and valve body 20. It is preferred that longitudinal movement between valve ball 200 and valve body 20 be minimized. It is also preferred that stem 500 be aligned with cylindrical opening 420 of trunnion support element 400 (and cylindrical opening 470 of second trunnion support element 450) as misalignment can cause difficulty in turning valve ball 200.

Valve ball 200 can be sealably connected to valve body 20 by means of opposed and biased seats 1000 and 1000'. Seats 1000 and 1000' can be supported in valve body 20 and biased toward valve ball 200, respectively in the directions of arrows 1510 and 1520. Accordingly, where flow passage 270 of valve ball 200 is rotated 90 degrees in relation to flow passage 60 of valve body 20 (e.g., in direction of arrow 1500), flow is cut off by the sealing effect of seats 1000 and 1000'. As the relative rotation between flow passage 270 of valve ball 200 and flow passage 60 of valve body 20 is reduced from 90 ninety degrees, the restriction of flow by valve ball 200 is reduced. Maximum flow through valve 10 is achieved when flow passage 270 of valve ball 200 is aligned with flow passage 60 of valve body 20 (i.e., when the relative rotation is zero degrees).

Generally two piece retainer 1100 can retain the valve components inside valve body 20. FIGS. 4 through 9 show various views of components of the two piece retainer 1100 which is generally comprised of rotationally static first section 1200 and rotating second section 1300.

Figure 6:
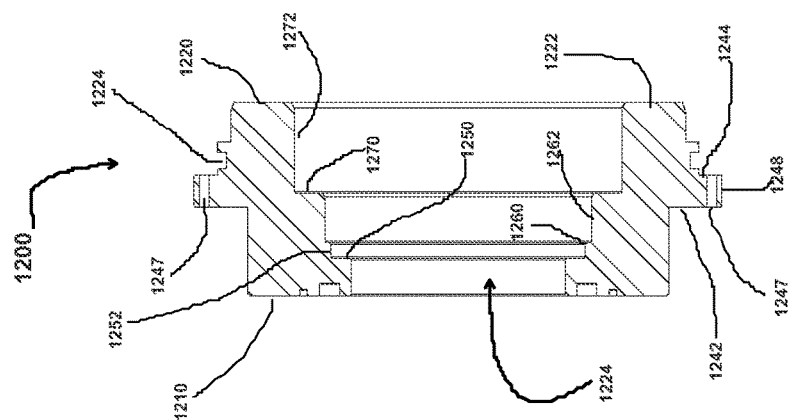
FIG. 6 is a sectional view of the first retainer section shown in FIGS. 4 and 5, taken along the lines 6-6.
Figure 5:
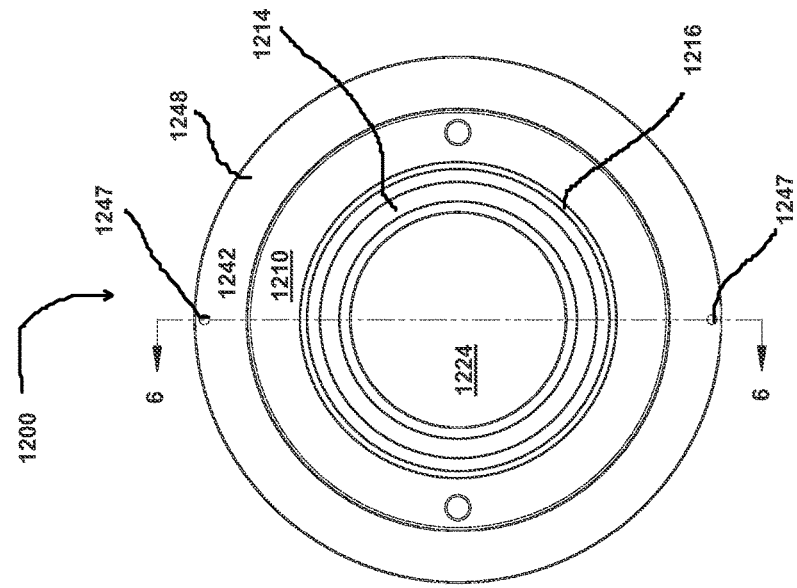
FIG. 5 is an end view of the first retainer section shown in FIG. 4.
Figure 4:
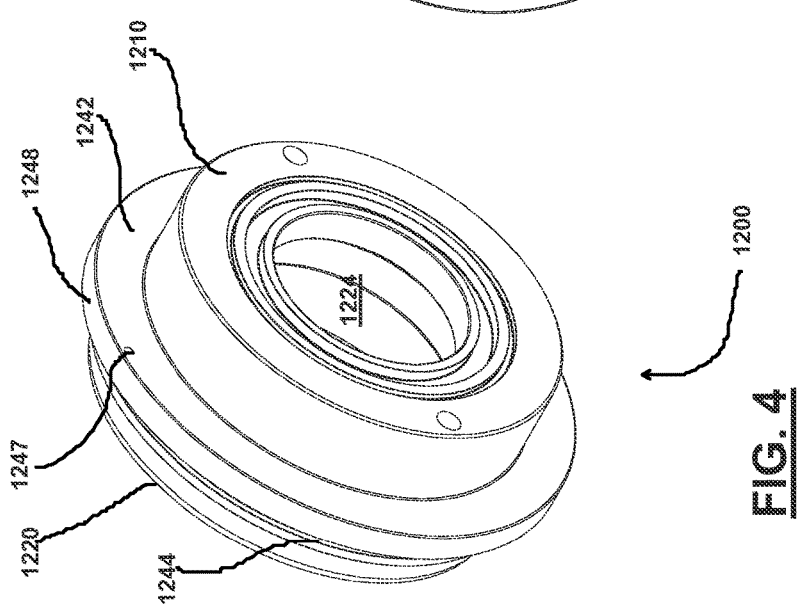
FIG. 4 is a perspective view of the first retainer section shown in the valve of FIG. 1.

FIG. 4 is a perspective view of first retainer section 1200. FIG. 5 is an end view of the first retainer section 1200. FIG. 6 is a sectional view of first retainer section 1200 taken along the lines 6-6. First section 1200 can include first and second shoulders 1250,1260 along with first and second circumferential areas 1252,1262 which accommodate seat 1000. Preferably, planar surface 1222 on second end limits the amount of longitudinal movement of first 400 and second 450 trunnion support elements which second retainer section 1300 is tightened in valve body 20. When retainer 1100 is installed in valve body 20, there exists a defined longitudinal length between planar surface 1222 of second retainer section 1200 and third shoulder 116 of valve body 20 so that trunnion support elements 400, 450 each have a limited defined space to sit in (i.e., the space between planar surface 1222 and third shoulder 116).

Preferably, a seal is maintained between first retainer section 1200 and valve body 20, which can be a lip seal. To facilitate this sealing, seal recess 1224 can be provided which can accommodates seals 1044, which seals can each include a lip seal and back-up ring (the back up ring increasing the sealing pressure rating and resisting extrusion of the lip seal). In one embodiment one or both of the back-up rings can be omitted.

Also preferably, a seal is maintained between first retainer section 1200 and valve seat 1000, which can be an o-ring type seal. To facilitate this sealing, seal recess 1040 can be provided which can accommodates seals 1042, which seals can each include an o-ring and back-up ring (the back up ring increasing the sealing pressure rating and resisting extrusion of the o-ring).

Figure 9:
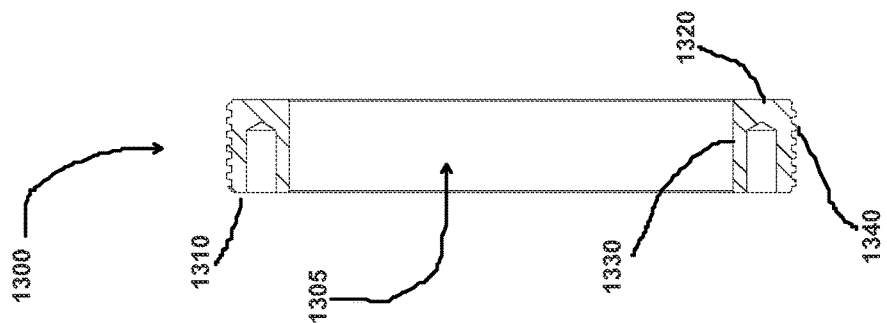
FIG. 9 is a sectional view of the second retainer section shown in FIGS. 7 and 8, taken along the lines 9-9.
Figure 8:
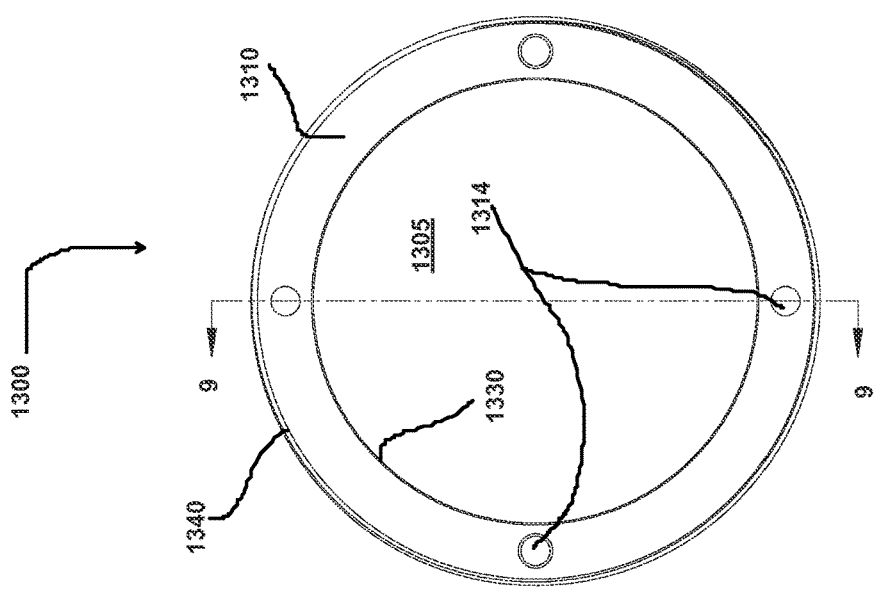
FIG. 8 is an end view of the second retainer section shown in FIG. 7.
Figure 7:
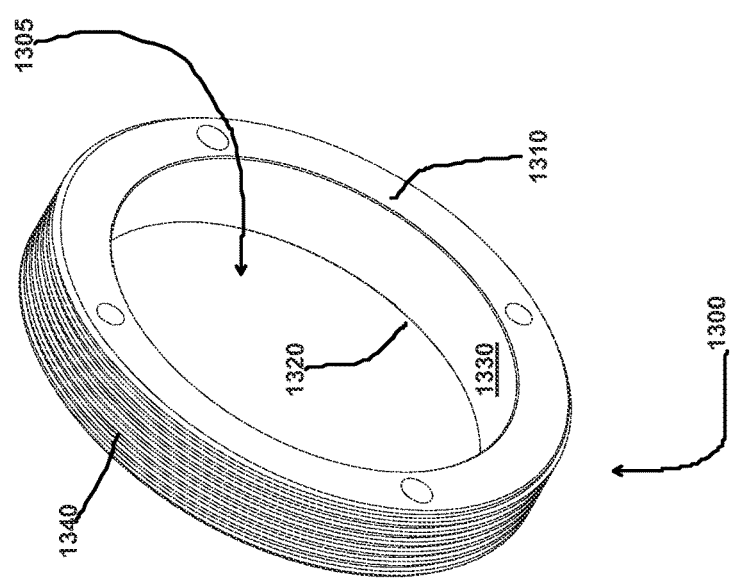
FIG. 7 is a perspective view of the second retainer section shown in the valve of FIG. 1.

FIG. 7 is a perspective view the second retainer section 1300. FIG. 8 is an end view of second retainer section 1300. FIG. 9 is a sectional view of second retainer section 1300 taken along the lines 9-9. Second retainer section can be a threaded ring like section having first end 1310 and second end 1320 with a central opening 1305. A threaded area 1340 can be used to threadably connect second section 1300 to valve body 20. A plurality of spaced apart openings 1314 can be used to connect section retainer section 1300 to a tool for tightening or loosening of second retainer section relative to valve body 20.

Assembly and Disassembly of Valve with Two Piece Retainer

FIG. 1 is a sectional side view of the assembled compact valve 10 using two piece retainer 1100 to hold in place various internal valve components. FIG. 2 is an end view of the compact valve 10, but all valve components shown in an exploded condition from the second end 40 of valve body 20 of compact valve 10. FIG. 3 is a sectional view of exploded compact valve 10 taken along the lines 3-3.

FIGS. 10 through 15 schematically indicate the assembly steps of placement of the retainer 1100's first 1200 and second 1300 retainer sections into valve body 20. FIG. 10 is a partially exploded perspective view of one embodiment of valve 10 showing compact valve body 20 with the two piece retainer 1100 positioned to be installed in valve body 20 where the valve ball 200, trunnion support elements 400, 450, and seats 1000,1000' are already installed in the valve body 20. FIG. 11 is a sectional view of the partially exploded view of valve 10 taken along with lines 11-11.

Figure 12:
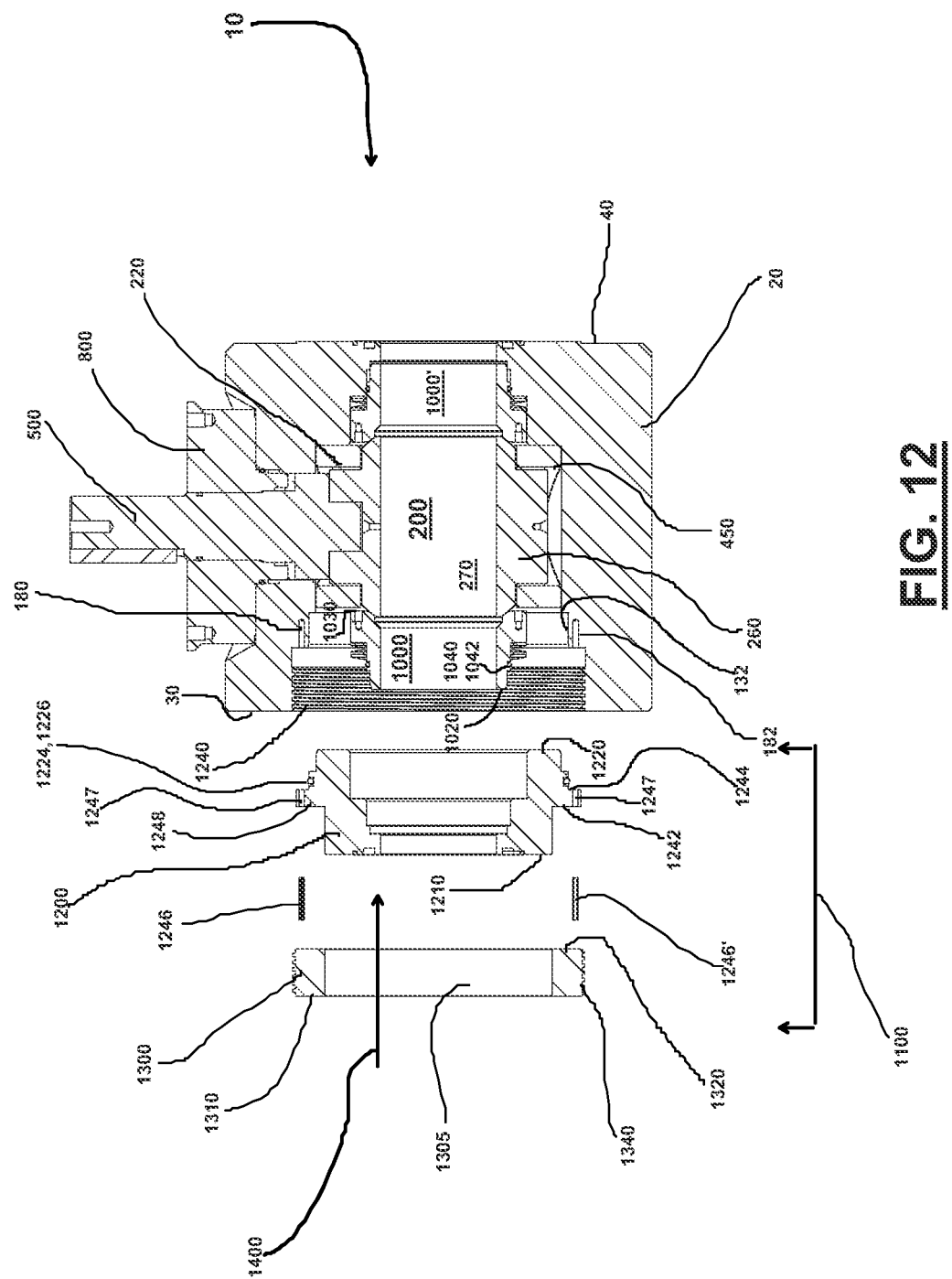
FIGS. 12 through 15 schematically indicate the assembly steps of placement of the first and second retainer sections into the valve body.

FIG. 12 shows both the first 1200 and second 1300 retainer sections before placement in valve body 20 of compact valve 10. Arrow 1400 schematically indicates the longitudinal movement which will occur in retain 1100 for pieces 1200,1300, although second retainer section 1300 which include rotational movement.

First section can include detachable seal 1226 which sits in recess 1224. Detachable seal 1226 can be a lip type seal. In one embodiment seal 1226 can include an extrusion ring to prevent extrusion of seal 1226. In one embodiment seal 1226 can be an o-ring type seal.

Seat retainer 1000 section can include detachable seal 1042 which sits in recess 1040. Detachable seal 1042 can be various conventionally available seals. In one embodiment seal 1042 can include an extrusion ring to prevent extrusion of seal 1042. In one embodiment seal 1042 can be an o-ring type seal.

Figure 13:
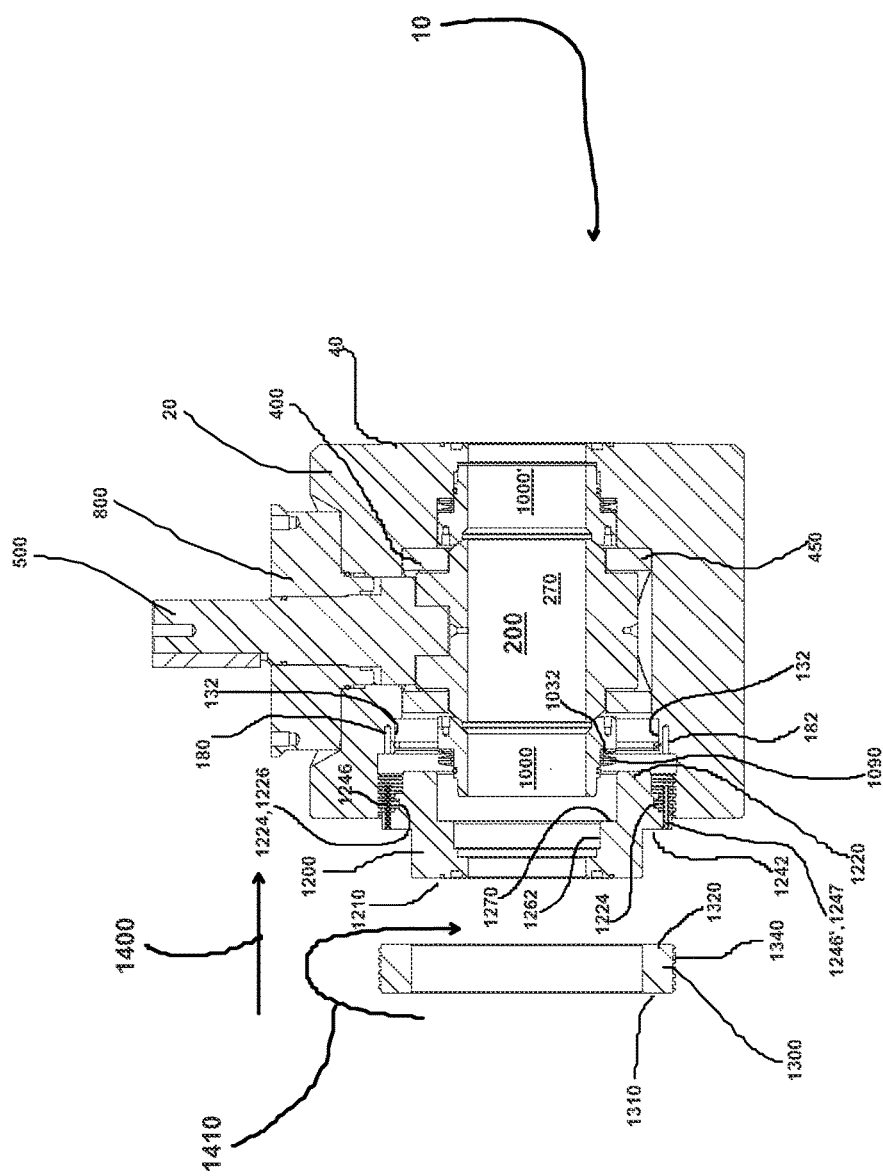

FIG. 13 shows valve 10 where first retainer section 1200 has been partially inserted into valve body 20, but second retainer section 1300 has not yet been inserted into valve body 20. At this point seal 1226 has not yet made contact with valve body 20. Seal 1224 is shown in the vicinity of threads 140. Also at this point seal 1042 of seat 1000 has not yet made contact with first retainer section 1200. Second retainer section 1300 is shown on the outside of valve body 20. Arrow 1410 schematically indicates that second retainer section 1300 will be rotated relative to valve body 20, however, during such rotation in the direction of arrow 1410 first retainer section will remain rotationally fixed relative to valve body 20 (and also relative to valve seat 1000). Arrow 1400 schematically indicates longitudinal movement of first retainer section 1200 relative to valve body 20 while simultaneously remaining rotationally static relative to valve body 20. In FIG. 13 is also shown retaining pins 1246,1246' in openings 1247 of first retainer 1200. Retainer pin 1246 will seat in opening 180 for restricting rotational movement of first retainer section 1200 relative to valve body 20. Retaining pin 1246' will seat in opening 182 for restricting rotational movement of first retainer section 1200 relative to valve body 20 (rotational movement schematically indicated by arrow 1410). However, both retaining pins 1246,1246' allow linear movement of first retainer section 1200 relative to valve body 20 (schematically indicated by arrow 1400).

Figure 14:
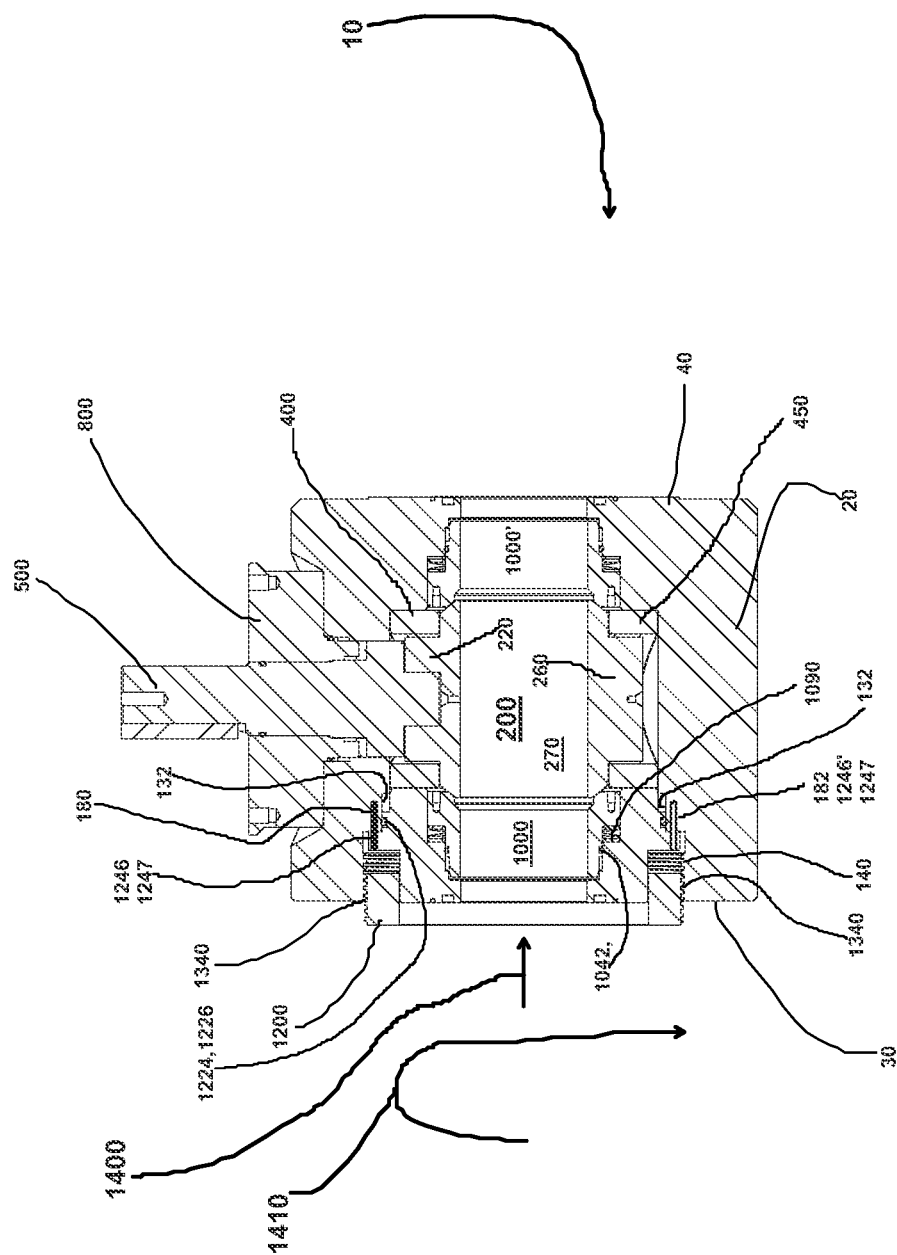

FIG. 14 shows valve 10 where both first 1200 and second 1300 retainer sections have been partially inserted into valve body 20. Threads 1340 of second retainer section 1300 have now engaged threads 140 of valve body. Seal 1226 has engaged surface 132 of valve body 20. Seal 1042 has engaged surface 1262 of first retainer section 1200. Both retaining pins 1246,1246' allow linear movement of first retainer section 1200 relative to valve body 20 (schematically indicated by arrow 1400). Rotational movement (schematically indicated by arrow 1410) of second retainer section 1300, with its threads 1340 engaging threads 140 of valve body 20, will cause second retainer section 1300 to move in the direction of arrow 1400 and push first retainer section 1200 in the direction of arrow 1400.

Figure 15:
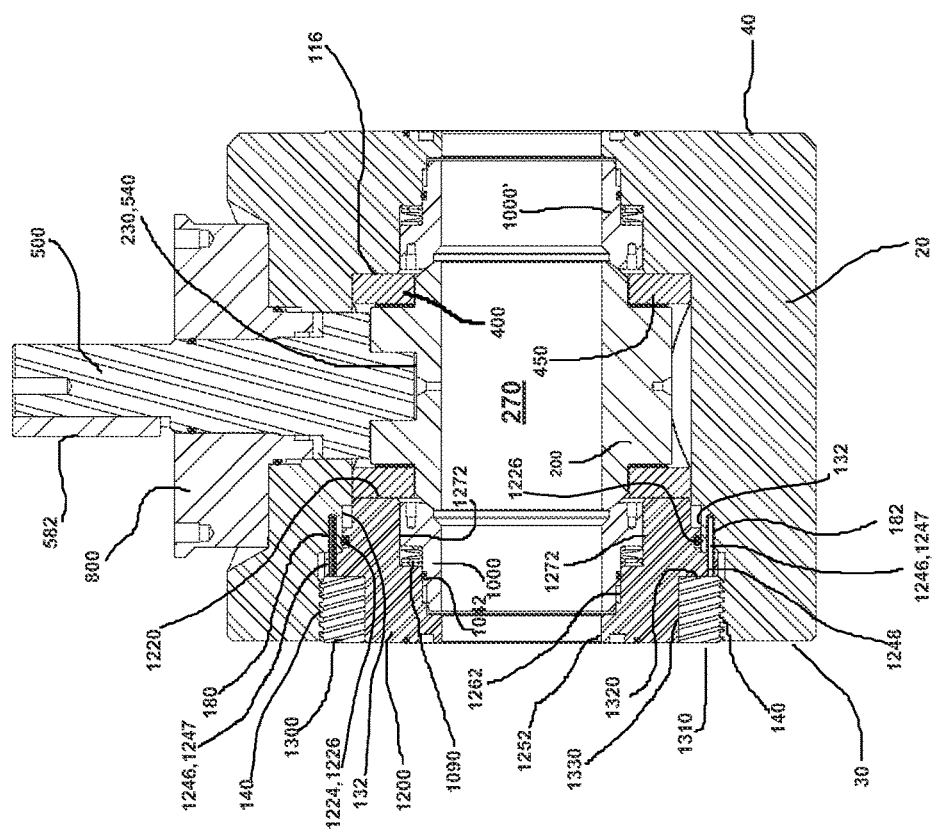

FIG. 15 shows valve 10 where both first 1200 and second 1300 retainer sections have been completely inserted into valve body 20. Continued rotational movement of second retainer section 1300 compared to FIG. 14 (schematically indicated by arrow 1410), with second retainer 1300 threads 1340 engaging threads 140 of valve body 20, will cause second retainer section 1300 to continue to also move linearly in the direction of arrow 1400 and continue to push first retainer section 1200 linearly in the direction of arrow 1400. During the linear pushing by second retainer section 1300, first retainer section 1200 moves only linearly (schematically indicated by arrow 1400) and is rotationally constrained by pins 1246 and 1246'. In this manner the seals 1226 and 1042 only see relative linear movement and no relative rotational movement. Eventually, second retainer section 1300 will push first retainer section 1200 enough in the direction of arrow 1400 that second end 1220 will contact both first 400 and second 450 trunnion supports locking linearly in place these trunnion support elements with shoulder 116 of valve body 20.

Disassembly of valve 20 can be performed by rotating second retainer section 1300 in a direction opposite of the rotational direction of arrow 1410. During disassembly, second retainer section 1200 also is constrained from rotational movement by pins 1246 and 1246'.

Valve Components

Below various individual components of valve 10 will be reviewed.

FIG. 16 is a perspective view of valve body 20 taken from the first end 30. FIG. 17 is a perspective view of valve body 20 taken from second end 40. FIG. 18 is a side view of valve body 20 taken from the second end 40. FIG. 19 is a sectional view of valve body 20 taken along the lines 19-19. Valve body can include first end 30 and second end 40. Flow passage 60 can proceed from first end 30 through second end 40. Stem 500 can be rotatably connected to valve body 20. Valve body 20 can include internal chamber 50 where valve ball 200 remains during use. From first end 30 to second end 40, valve body 20 can include threaded area 140, second cylindrical area 135, second shoulder 134, first cylindrical area 132, first shoulder 130, internal bore 50, shoulder 116, cylindrical area 112, shoulder 110, cylindrical area 102, cylindrical bore 102. First and second shoulders 100,110 are found in seat recess 120. Bonnet recess 80 can be provided for allowing attachment of bonnet 800 to valve body 20. One or more threaded bores 88 can be provided for fasteners 832. Openings 834,834' can be used for inserting a stop pin 836. Lubrication port 160 and vent/bleeding port 162 can be respectively provided for lubrication fitting 161 and vent/bleeding fitting 163.

FIGS. 29 through 34 show the components of the valve bonnet 800 and stem 700 assembly.

FIG. 32 is a perspective view of stem 500. FIG. 33 is a side view of stem 500. FIG. 34 is a sectional view of stem 500 taken along the lines 34-34. Stem 500 can comprise shaft 510, and ball drive element 520. Ball drive element 520 can include substantially planar drive surface 530. Circumferential bearing surface 550 can be included for rotatably connecting stem 500 with valve body 20 through stem receptacle 70. Shaft 510 can include recess 580 for a key 582 which key can be used to operatively connect stem 500 to an actuator.

Figure 31:
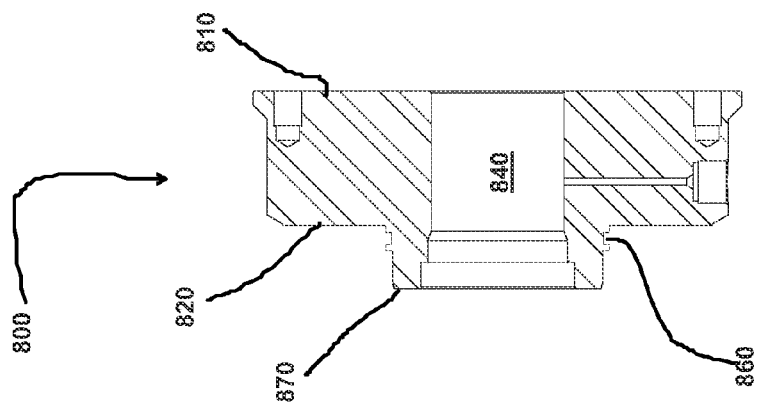
FIG. 31 is a sectional view of the bonnet shown in FIGS. 29 and 30, taken along the lines 31-31.
Figure 30:
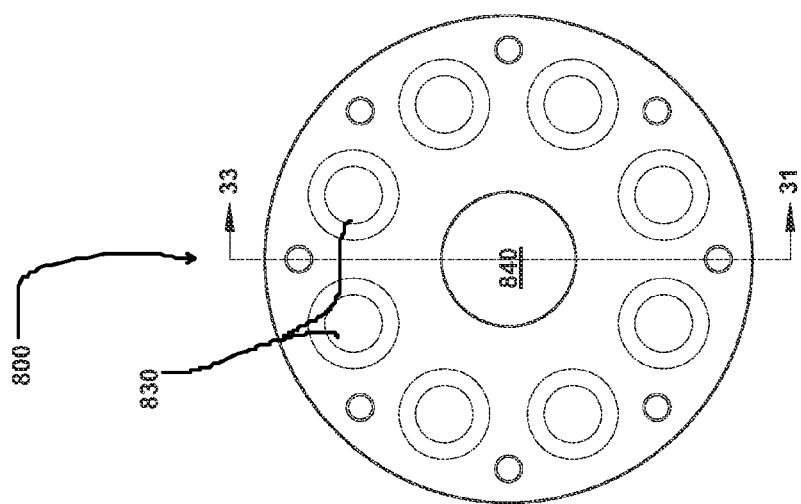
FIG. 30 is an end view of the bonnet shown in FIG. 29.
Figure 29:
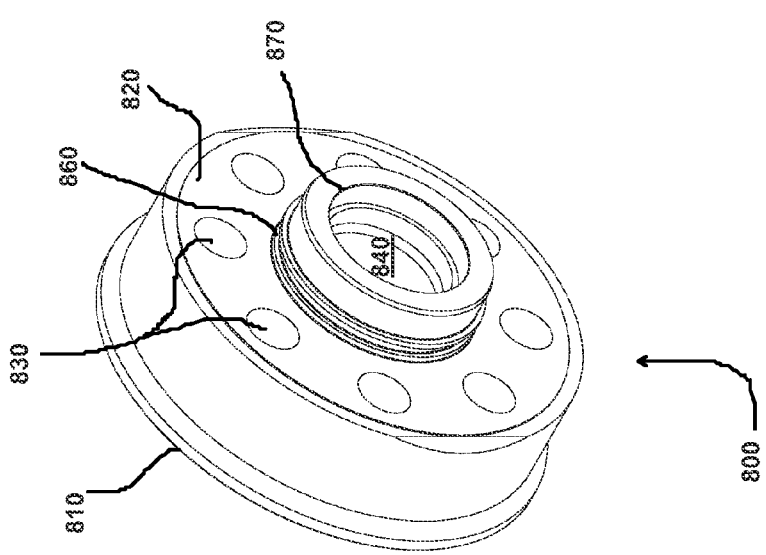
FIG. 29 is a perspective view of the bonnet shown in the valve of FIG. 1.

FIG. 29 is a perspective view of bonnet 800. FIG. 30 is an end view of bonnet 800. FIG. 31 is a sectional view of bonnet 800 taken along the lines 31-31. Bonnet 800 can be used to prevent stem 500 from blowing out of valve body 20. Bonnet 800 can be connected to valve body 20 through one or more fasteners 832. Bonnet 800 can include tip 870. Preferably, a seal is maintained between bonnet 800 and valve body 20. To facilitate this seal, recess 860 can be provided which can include seal 862 such as an o-ring and back-up ring (the back up ring increasing the sealing pressure rating and resisting extrusion of the o-ring).

Figures 20, 21, 22:
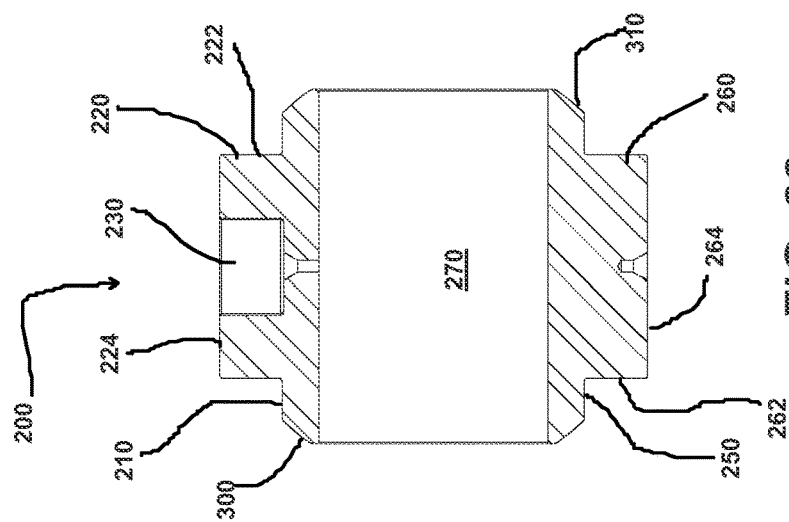
FIG. 20 is a perspective view of the valve ball shown in the valve of FIG. 1.
FIG. 21 is an end view of the valve ball shown in FIG. 16.
FIG. 22 is a sectional view of the valve ball in FIGS. 20 and 21, taken along the lines 21-21.

FIG. 20 is a perspective view of valve ball 200. FIG. 21 is an end view of valve ball 200. FIG. 22 is a sectional view of valve ball 200 taken along the lines 21-21. Valve ball 200 can be spherically shaped and include top 210, bottom 250, and flow passage 270. Upper spherical surface segment can be located by top 210 and lower spherical surface segment 310 can be located by bottom 250. Stem recess 230 can be included.

Trunnion 220 can be located on top 210 and can include cylindrical area 222. Cylindrical area 222 can be rotatably or pivotally connected to trunnion support element 400. Bearing surface 224 can be substantially planar and slidingly contact first surface 402 of trunnion support element 400. Preferably, a trunnion shim 404 is provided to act as a bearing surface between bearing area 224 of valve ball 200 and trunnion support element 400. Also preferably, trunnion bearing 425 is provided between trunnion 220 and trunnion support element 400. Also preferably, trunnion 220 is prevented from contacting valve body 20 to prevent wear.

Trunnion 260 can be located on bottom 250 and can include cylindrical area 262. Cylindrical area 262 can be rotatably or pivotally connected to trunnion support element 450. Bearing surface 264 can be substantially planar and slidingly contact first surface 452 of trunnion support element 450. Preferably, a trunnion shim 454 is provided to act as a bearing surface between bearing area 264 of valve ball 200 and trunnion support element 450. Also preferably, trunnion bearing 475 is provided between trunnion 260 and trunnion support element 450. Also preferably, trunnion 260 is prevented from contacting valve body 20 to prevent wear.

Upper and lower spherical segments 300,310 can each be sealably connected to both seats 1000,1000'.

FIG. 23 is a perspective view of trunnion support element 400 shown in the valve of FIG. 1. FIG. 24 is an end view of trunnion support element 400. FIG. 25 is a sectional view of trunnion support element 400, taken along the lines 25-25. Trunnion support element 450 can be substantially similar to trunnion support element 400 and will not be described separately. Cylindrical opening 420 can be provided to slidably connect upper trunnion 220 of valve ball 200. First and third sides 416,418 of trunnion support element 400 can be held in place between third shoulder 116 of valve body 20 and second end 1220 of first retainer section 1200 (limiting movement of trunnion support element 400 in the direction of arrows 1510,1520).

Figure 28:
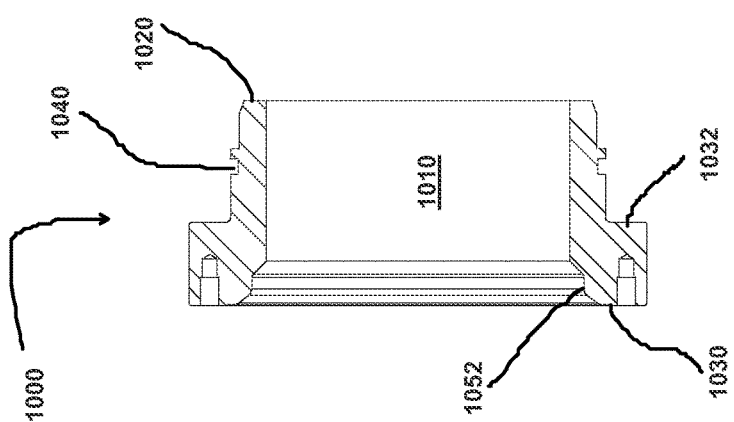
FIG. 28 is a sectional view of the seat shown in FIGS. 26 and 27, taken along the lines 28-28.
Figure 27:
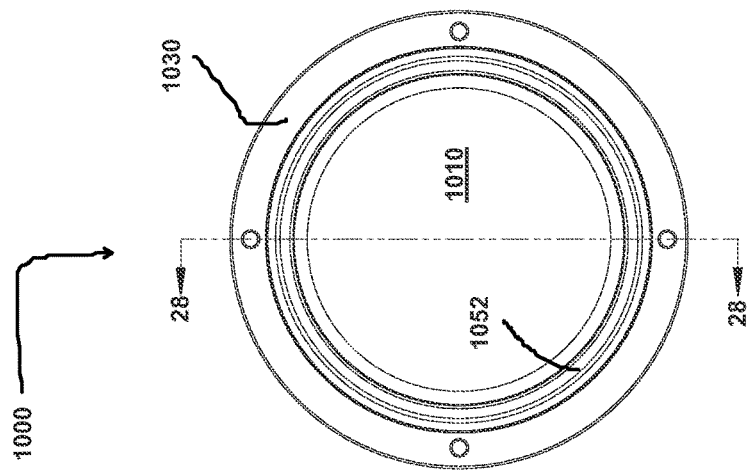
FIG. 27 is an end view of the seat shown in FIG. 26.
Figure 26:
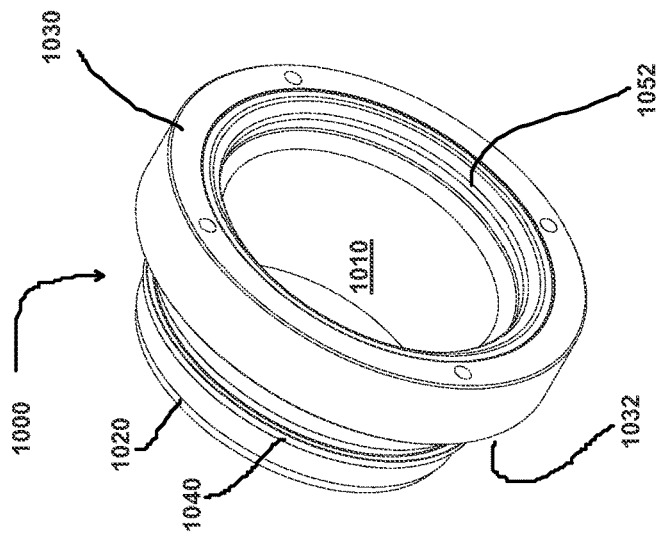
FIG. 26 is a perspective view of the seat shown in the valve of FIG. 1.

FIG. 26 is a perspective view of 1000. FIG. 27 is an end view of seat 1000. FIG. 28 is a sectional view of seat 1000 taken along the lines 28-28. Seat 1000' can be constructed substantially similar to seat 1000 (and seat 1000' will not be individually described). Seat 1000 can include internal passage 1010, first side 1020, second side 1030, along with first and second circumferential areas 1070,1080. First and second circumferential areas 1070, 1080 of seat 1000 sit respectively in first and second circumferential areas 1252, 1262 of retainer 1200. (For seat 1000', first and second circumferential areas 1070,1080 sit respectively in cylindrical areas 112,102 of valve body 20).

Preferably, a seal is maintained between seat 1000 and valve body 20 (or second retainer section 1200). To facilitate this seal, recess 1040 can be provided which can include seal 1042, which seal can each include an o-ring and back-up ring (the back up ring increasing the sealing pressure rating and resisting extrusion of the o-ring). Preferably, a seal is maintained between seat 1000 and valve ball 200. To facilitate this seal, recess 1050 can be provided which can include seal 1052, which seal 1052 seals with upper and lower spherical surfaces 300,310 of valve ball 200 (seat 1000' is substantially the same). Seal 1052 can be installed in recess 1050 using any conventional means, such as crimping, adhesive, friction fit, or other means.

To facilitate sealing at lower line pressures between seats 1000,1000' and valve ball 200, biasing members 1090,1090' can be provided which respectively push seat 1000 in the direction of arrow 1520 and seat 1000' in the direction of arrow 1510 (both seats toward valve ball 200). At higher line pressures seats 1000,1000' will tend to be pushed toward valve ball 200 because the larger exposed surface area on first side 1020 as opposed to second side 1030. This is because line fluid will not be able to pass seal 1052 thereby limiting the amount of surface area to which the line fluid can assert pressure. In an alternative embodiment a second set of biasing members can be provided for second circumferential area 1080 (or area 1080' for seat 1000'). In one embodiment, peripheral groove 1082 can be provided to reduce the amount of surface area of seat 1000 which contacts valve body 20 (or retainer 1200 for seat 1000') thereby reducing frictional forces between these items.

In any of the embodiments a lip seal can be used as the sealing element. In any of the embodiments an extrusion ring can be used in combination with the lip seal.

The following is a list of reference numerals:

| LIST FOR REFERENCE NUMERALS | |
|---|---|
| (Reference No.) | (Description) |
| 10 | compact manifold ball valve |
| 20 | body |
| 30 | first end |
| 38 | bores for fasteners |
| 40 | second end |
| 42 | raised area |
| 44 | peripheral groove for seal |
| 46 | seal |
| 48 | bores for fasteners |
| 50 | internal chamber |
| 60 | flow passage |
| 70 | stem receptacle |
| 72 | bore |
| 80 | bonnet recess |
| 88 | bores for fasteners |
| 90 | seat recess |
| 100 | first shoulder |
| 102 | cylindrical area |
| 110 | second shoulder |
| 112 | cylindrical area |
| 116 | third shoulder |
| 118 | cylindrical area |
| 120 | seat recess |
| 130 | first shoulder |
| 132 | cylindrical area |
| 134 | second shoulder |
| 135 | cylindrical area |
| 138 | third shoulder |
| 139 | cylindrical area |
| 140 | threaded area |
| 150 | internal bore |
| 152 | cylindrical area |
| 160 | lubrication port |
| 161 | lubrication fitting |
| 162 | vent/bleeding port |
| 163 | vent/bleeding fitting |
| 180 | opening |
| 182 | opening |
| 200 | valve ball |
| 210 | top |
| 220 | trunnion |
| 222 | cylindrical area |
| 224 | bearing area |
| 230 | recess for stem |
| 250 | bottom |
| 260 | trunnion |
| 262 | cylindrical area |
| 264 | bearing area |
| 270 | flow passage |
| 280 | first end |
| 290 | second end |
| 300 | spherical surface segment |
| 310 | spherical surface segment |
| 400 | first trunnion support element |
| 402 | first surface |
| 404 | trunnion bearing |
| 405 | trunnion shim/bearing |
| 410 | second surface |
| 416 | first side |
| 417 | second side |
| 418 | third side |
| 419 | fourth side |
| 420 | cylindrical opening |
| 425 | trunnion bearing |
| 430 | recessed area |
| 450 | second trunnion support element |
| 452 | first surface |

-continued

| LIST FOR REFERENCE NUMERALS | |
|---|---|
| (Reference No.) | (Description) |
| 454 | trunnion bearing |
| 455 | trunnion shim/bearing |
| 460 | second surface |
| 466 | first side |
| 467 | second side |
| 468 | third side |
| 469 | fourth side |
| 470 | cylindrical opening |
| 475 | trunnion bearing |
| 480 | recessed area |
| 500 | stem |
| 510 | shaft |
| 520 | ball drive element |
| 530 | substantially planar drive surface |
| 540 | tip |
| 550 | bearing surface |
| 552 | bearing |
| 570 | top |
| 580 | recess for key |
| 582 | key |
| 800 | bonnet |
| 810 | first end |
| 820 | second end |
| 830 | plurality of recessed bores |
| 832 | plurality of fasteners |
| 833 | plurality of caps |
| 834 | opening for stop pin |
| 836 | stop pin |
| 840 | opening |
| 850 | recess |
| 852 | seal |
| 860 | recess |
| 862 | seal |
| 870 | tip |
| 880 | flat area |
| 890 | bore for stop pin |
| 892 | stop pin |
| 894 | grease bore |
| 896 | lubrication fitting |
| 1000 | seat |
| 1010 | internal passage |
| 1020 | first side |
| 1022 | planar surface |
| 1030 | second side |
| 1032 | shoulder |
| 1040 | recess |
| 1042 | seal and extrusion ring |
| 1044 | seal and extrusion ring |
| 1052 | seal or face seal |
| 1090 | circular wave spring |
| 1100 | two piece retainer |
| 1200 | first piece of retainer |
| 1210 | first end |
| 1212 | planar surface |
| 1214 | first recessed area |
| 1220 | second end |
| 1222 | planar surface |
| 1224 | seal recess |
| 1226 | seal |
| 1230 | internal passage |
| 1242 | first end |
| 1244 | second end |
| 1246 | plurality of shearable retainers to restrict rotation |
| 1247 | plurality of openings |
| 1248 | peripheral edge |
| 1250 | first shoulder |
| 1252 | first circumferential area |
| 1260 | second shoulder |
| 1262 | second circumferential area |
| 1270 | third shoulder |
| 1272 | third circumferential area |
| 1300 | second piece of retainer |
| 1305 | opening |
| 1310 | first end |
| 1314 | plurality of openings |

-continued

LIST FOR REFERENCE NUMERALS

| (Reference No.) | (Description) |
|---|---|
| 1320 | second end |
| 1330 | internal passage |
| 1340 | threaded area |
| 1400 | arrow |
| 1410 | arrow |
| 1500 | arrow |
| 1510 | arrow |
| 1520 | arrow |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

We claim:

1. A compact manifold ball valve, comprising:
   (a) a valve body, the valve body having first and second ends, a valve passage having a longitudinal axis and extending from the first end to the second end, one of said ends having an internally threaded portion;
   (b) a valve stem, the valve stem being rotatably connected to the valve body;
   (c) a valve ball, the valve ball being located in the valve passage, the valve ball having an upper end, lower end, and flow passage, and a pair of spaced apart trunnions;
   (d) a pair of spaced apart trunnion support plates, the pair of spaced apart trunnion support plates being located in the valve chamber and rotatably connected to the pair of spaced apart valve trunnions;
   (e) a two piece retainer, the two piece retainer being detachably connected to the valve body and limiting the amount of longitudinal movement by at least one of the pair of trunnion support plates;
   (f) the two piece retainer having first and second sections, the first section being sized and shaped to be installed in the valve passage with a generally longitudinal movement, the first section having a transverse annular face that engages both of said trunnion support plates and a first annular surface spaced from said transverse annular face, wherein the first section is connected to the valve body such that the first section is prevented from rotating relative to the valve body,
   g) the second section being a ring member with an externally threaded periphery and being rotatable to thread it into the valve passage of the valve body at said internally threaded portion and forming a threaded connection;
   h) wherein the second section is positioned to push on the first section responsive to the formation of said threaded connection of the ring member to the valve body; and
   i) the second section having an inner annular shoulder that surrounds said first annular surface; wherein the second section of the two piece retainer is both threadably connected to the valve body and concentrically positioned in said valve body, wherein rotation of the second section relative to the said valve body enables selective tightening or loosening of the first section relative to the said valve body; wherein the second section is a ring, and rotational movement of the second section causes linear movement of the second section relative to the valve body; wherein rotational movement of the first section of the two piece retainer relative to the valve body is constrained; and wherein at least one locking pin between the first section and the valve body rotationally locks the first section relative to the valve body while allowing linear movement of the first section relative to the valve body, and the second section is in direct contact with the at least one locking pin.

2. The compact manifold ball valve of claim 1, wherein each trunnion support plate includes a circular trunnion bearing rotatably connected to one of the pair of spaced apart trunnions of the valve ball.

3. The compact manifold ball valve of claim 1, wherein rotational movement of the first section relative to the valve body is prevented by a plurality of locking pins between the first section and the valve body, while relative linear movement is allowed between the first section and the valve body.

4. The compact manifold ball valve of claim 1, wherein the first section includes a detachable sealing element along with the at least one locking pin between the first section and the valve body rotationally locks the first section relative to the valve body while simultaneously allowing linear movement of both the first section and sealing element relative to the valve body.

5. The compact manifold ball valve of claim 1, wherein the first section includes a first detachable sealing element which fluidly seals the first section to the valve body, and the first valve seat includes a second detachable sealing element which fluidly seals the first valve seat to the first section.

6. The compact manifold ball valve of claim 5, wherein the first sealing element forms a seal between the first section and valve body, while the second sealing element forms a seal between the first section and first valve seat.

7. The compact manifold ball valve of claim 5, wherein the first section also includes the at least one locking pin between the first section and the valve body that rotationally locks the first section relative to the valve body while simultaneously allowing linear movement of the first section and the first sealing element relative to the valve body, along with relative movement between the first section and second sealing element attached to the first valve seat with respect to the first section.

8. The compact manifold ball valve of claim 7, wherein the at least one locking pin between the first section and the valve body has a predefined shearing force where a rotational force exceeding the predefined shearing force will cause the said at least one locking pin to shear and allow relative rotational movement between the first section and valve body.

9. The compact manifold ball valve of claim 5, wherein the first section includes first and second detachable and spaced apart sealing elements, along with at least one locking pin that rotationally locks the first section relative to the valve body while simultaneously allowing linear movement of the first section and the attached first and second sealing elements relative to the valve body.

10. The compact manifold ball valve of claim 9, wherein the first sealing element forms a seal between the first section and valve body, while the second sealing element forms a seal between the first section and first valve seat.

11. The compact manifold ball valve of claim 1, further including first and second valve seats, wherein the first valve seat is operatively connected to a first biasing member and the second valve seat is operatively connected to a second biasing member, wherein the first and second biasing members respectively bias their respective valve seat to maintain contact with the valve ball.

12. The compact manifold ball valve of claim 11, wherein the two piece retainer longitudinally holds in place at least one of the trunnion support plates restricting the amount of longitudinal movement of said pair of spaced apart trunnion support plates.

13. The compact manifold ball valve of claim 12, wherein the two piece retainer longitudinally holds in place both trunnion support plates such that no longitudinal movement is allowed.

14. The compact manifold ball valve of claim 12, wherein the first section includes a sealing portion having no relative rotational movement between sealing elements for the first valve seat during relative movement between the first section and first valve seat during valve assembly, and little to no relative rotational movement between sealing elements for the valve body and two piece retainer during relative movement between the first section and valve body during valve assembly.

15. The compact manifold ball valve of claim 12, wherein the first section includes a sealing portion having no relative rotational movement between sealing elements for the first valve seat during relative movement between the first section and first valve seat during valve assembly.

16. The compact manifold ball valve of claim 15, wherein the second section is both threadably connected to the valve body and concentrically positioned in said valve body relative to said longitudinal axis.

17. A compact manifold ball valve, comprising:
(a) a valve body, the valve body having first and second ends, a valve passage having a longitudinal axis and extending from the first end to the second end at least one said end having an internally threaded portion;
(b) a valve stem, the valve stem being rotatably connected to the valve body;
(c) a valve ball, the valve ball being located in the valve passage, the valve ball having an upper end, lower end, and flow passage, and a pair of spaced apart trunnions, wherein the valve ball is connected to and rotates with the stem;
(d) a pair of spaced apart trunnion support plates, the pair of spaced apart trunnion support plates being located in the valve chamber and rotatably connected to the pair of spaced apart valve trunnions;
(e) a two piece retainer, the two piece retainer being detachably connected to the valve body and limiting the amount of longitudinal movement of the pair of trunnion support plates;
(f) the two piece retainer having first and second sections, the first section being sized and shaped to be installed in the valve passage with a generally longitudinal movement, the first section having a transverse annular face that engages both of said trunnion support plates and an annular surface spaced from said transverse annular face, wherein the first section is connected to the valve body such that the first section is prevented from rotating relative to the valve body;
(g) the second section being a ring member with an externally threaded periphery and being rotatable to thread it into the valve passage of the valve body forming a threaded connection with the valve body at said internally threaded portion;
(h) wherein the second section is positioned to push on the first section responsive to a formation of said threaded connection; and
(i) the second section having an inner annular shoulder that surrounds said annular surface; wherein the second section of the two piece retainer is both threadably connected to the valve body and concentrically positioned in said valve body, wherein rotation of the second section relative to the said valve body enables selective tightening or loosening of the first section relative to the said valve body, and the first section includes at least one locking pin spanning between the first section and the valve body, and the second section is in contact with the at least one locking pin.

18. The compact manifold ball valve of claim 17, wherein the first section includes a sealing portion having no relative rotational movement between sealing elements for the first valve seat during relative movement between the first section and first valve seat during valve assembly, and little to no relative rotational movement between sealing elements for the valve body and two piece retainer during relative movement between the first section and valve body during valve assembly.

19. The compact manifold ball valve of claim 17, wherein the second section is a ring, and rotational movement of the second section causes linear movement of the second section relative to the valve body.

20. The compact manifold ball valve of claim 17, wherein the at least one locking pin rotationally locks the first section relative to the valve body by a plurality of locking pins between the first section and the valve body, while allowing linear movement of the first section relative to the valve body.

21. The compact manifold ball valve of claim 17, wherein rotational movement of the first section relative to the valve body is prevented by a shearable connection between the first section and the valve body, while relative linear movement is allowed between the first section and the valve body.

22. The compact manifold ball valve of claim 17, wherein the first section includes a detachable sealing element along with the at least one locking pin between the first section and the valve body that rotationally locks the first section relative to the valve body while simultaneously allowing linear movement of both the first section and sealing element relative to the valve body.

23. The compact manifold ball valve of claim 17, wherein the first section also includes the at least one locking pin between the first section and the valve body that rotationally locks the first section relative to the valve body while simultaneously allowing linear movement of the first section and the first sealing element relative to the valve body, along with relative movement between the first section and second sealing element attached to the first valve seat with respect to the first section.

* * * * *